Jan. 1, 1935. F. H. SHARAR 1,986,123
BRAKE
Filed Sept. 8, 1932 3 Sheets-Sheet 1

Inventor
F. H. Sharar
By C. A. Snow & Co.
Attorneys.

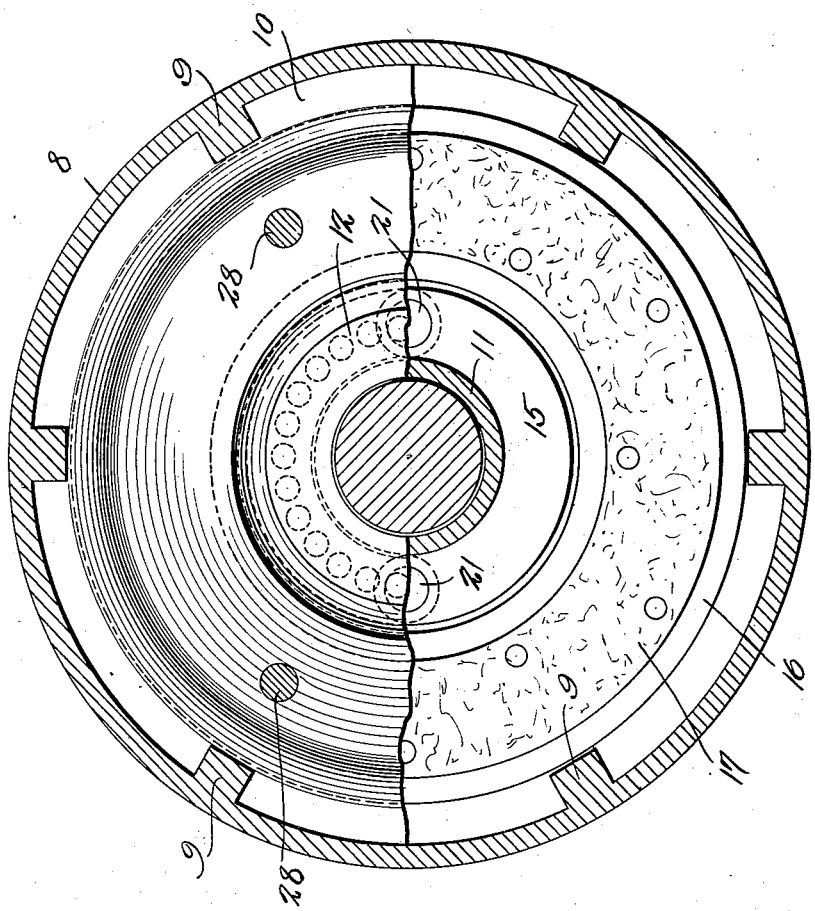
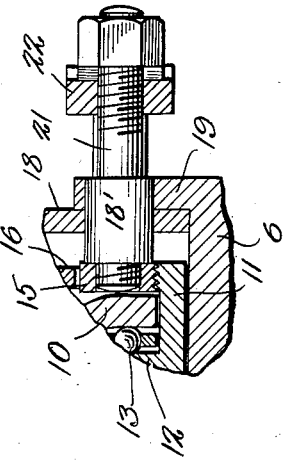
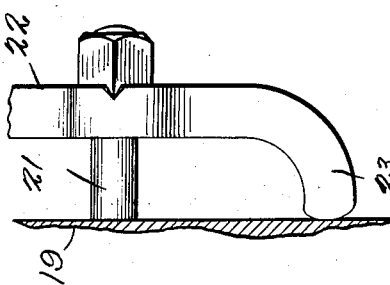

Jan. 1, 1935.  F. H. SHARAR  1,986,123
BRAKE
Filed Sept. 8, 1932  3 Sheets-Sheet 3

Inventor
F. H. Sharar
By C. A. Snow & Co.
Attorneys.

Patented Jan. 1, 1935

1,986,123

UNITED STATES PATENT OFFICE 1,986,123

BRAKE

Fred H. Sharar, Williamsport, Pa.

Application September 8, 1932, Serial No. 632,211

2 Claims. (Cl. 188—72)

This invention relates to brakes designed primarily for use in connection with motor vehicles, an important object of the invention being to provide a brake which will insure the maximum braking qualities at all times, with the minimum amount of power.

Another important object of the invention is the provision of a brake wherein there is absolutely no resistance offered by the elements thereof when the brake is inactive, or when the wheel or movable member braked by the device, is running free.

A still further object of the invention is to provide a brake which may be readily and easily dismantled, to permit the repair and adjustment of the brake, with facility.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a sectional view taken on line 2—2 of Figure 1.

Figure 3 is a sectional detail view illustrating one of the sliding bolts that have connection with the flanged sliding pressure sleeve.

Figure 4 is a fragmental detail view illustrating the connection between the brake yoke and brake housing.

Figure 1:
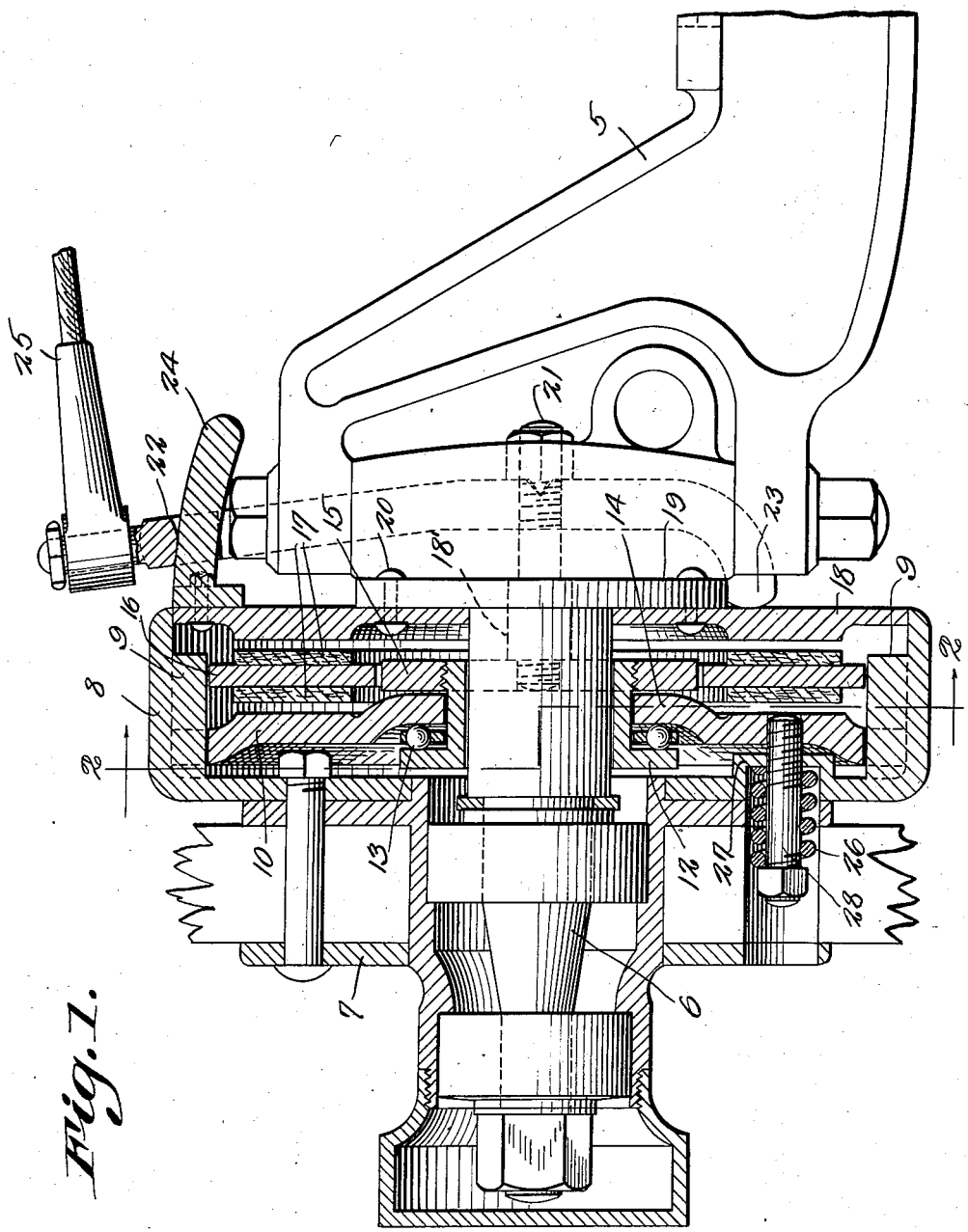
Figure 1 is a sectional view through a brake constructed in accordance with the invention, and illustrating the brake as applied to a front wheel of a motor vehicle.
Figure 5:
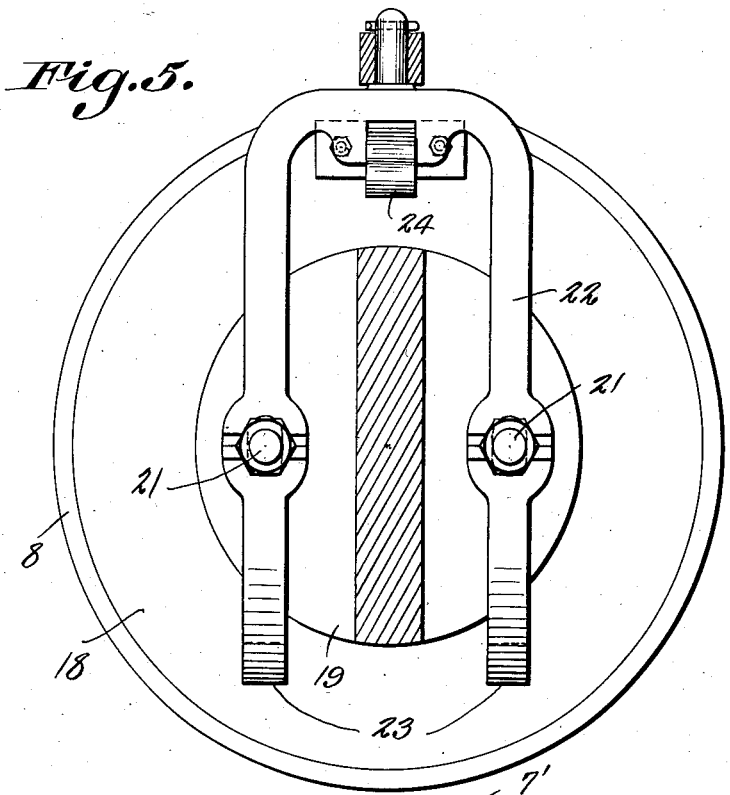
Figure 5 is an end elevational view of the brake operating yoke.

Referring to the drawings in detail, the reference character 5 designates one end of the front axle of a motor vehicle, which is of the usual construction, the same being provided with means for pivotally connecting the axle 6 thereto.

The wheel in the present showing, is indicated by the reference character 7 and is of the artillery type. Bolted to the wheel near the hub thereof, is a brake drum 8, which is provided with ribs 9 formed on the inner surface thereof, and arranged in spaced relation with each other.

These ribs 9 provide guides for the movable brake disk 10, which is formed with notches to accommodate the ribs 9 in such a way that movement of the brake disk 10 longitudinally of the ribs 9, will be permitted, but rotary movement of the disk 10 with respect to the brake drum, prevented.

This movable brake disk 10, is formed with a central opening within which the flanged sliding pressure sleeve 11 is mounted, the pressure sleeve being formed with an annular flange 12, providing a stop against which the ball race 13 engages.

As clearly shown by Figure 1 of the drawings, the brake disk 10 is formed with an inwardly curved portion 14 against which the ball race 13 engages, the inwardly curved portion and annular flange constituting a housing for the ball race.

The length of the sleeve 11 is such that the inner end of the sleeve extends an appreciable distance beyond the inner surface of the movable brake disk 10, where it is provided with threads that cooperate with internal threads formed on the bearing ring 15.

Surrounding the bearing ring 15, is a floating friction ring 16, which has its outer surface provided with friction members 17, which are circular in formation, and constructed of friction material such as asbestos, or other material commonly used in lining brakes.

The inner side of the brake drum is closed by means of the disk 18, which is riveted to the axle flange 19, by means of rivets 20.

Secured to the bearing ring 15, are bolts 21 that are disposed opposite to each other and extended an appreciable distance inwardly from the disk 18, the bolts being formed with bearings 18' that move through openings in the disk 18.

These bolts provide supports for the brake operating yoke 22 which is formed with outwardly curved end portions 23 which contact with the disk 18, as clearly shown by the drawings.

The upper end of the brake operating yoke is guided by the finger 24 that extends inwardly from the disk 18, the finger passing through an opening formed in the yoke, near the upper end thereof.

A brake operating rod indicated by the reference character 25 connects with the yoke, so that when the rod 25 is operated, the brake will be operated to accomplish its purpose.

In order that the movable brake disk 10 will be normally held out of contact with the floating friction ring 16, coiled springs 26 are provided, which coiled springs are seated in the offset portions 27 of the brake drum.

Bolts extend through the springs 26, and have their inner ends threaded in openings formed in the movable brake disk, with the result that the action of the spring will be to urge the brake disk to its inoperative position.

In the operation of the device, assuming that the elements of the brake are in positions as shown by Figure 1 of the drawings and it is desired to apply the brake to retard movement of the wheel 7, it is only necessary to pull the brake operating rod 25. This movement results in the brake operating yoke rocking, or moving inwardly, pulling the bearing ring 15 towards the axle 5.

As the bearing ring 15 moves inwardly, the brake disk 10 is moved into engagement with the floating friction ring 16, to move the floating friction ring inwardly and clamp the floating friction ring between the brake disk 10 and disk 18.

As the rod 25 is released, the coiled springs 26 operate to return the brake disk 10 to its normal position.

Figure 6:
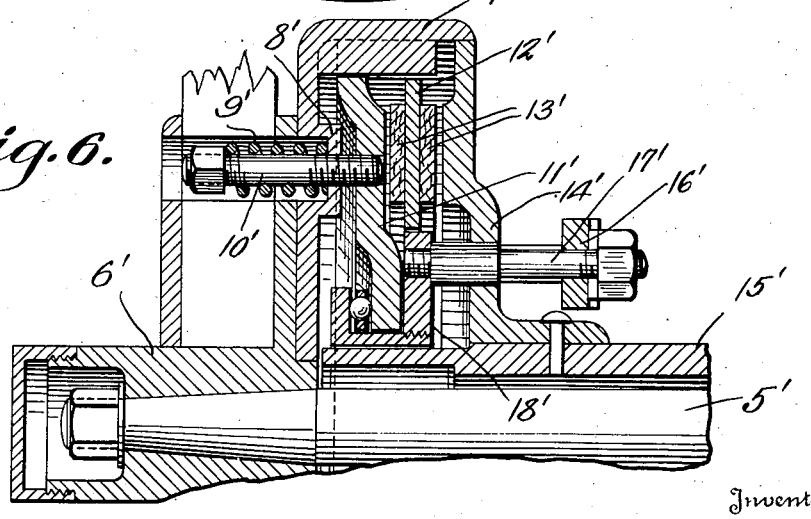
Figure 6 is a sectional view through the rear wheel of a motor vehicle, and illustrating the brake applied thereto.

In the form of the invention as shown by Figure 6 of the drawings, the brake is shown as applied to the rear wheel of a motor vehicle. In this showing, the rear axle is indicated by the reference character 5', to which the wheel 6' is secured. The brake drum is indicated generally by the reference character 7' and is provided with recessed portions 8' to accommodate the springs 9' through which the connecting bolts 10' extend.

These connecting bolts 10' have threaded end portions disposed in threaded openings of the brake disk 11' that moves within the brake drum, in the same manner as the brake drum 10, shown by Figure 1 of the drawings.

The floating friction disk is indicated by the reference character 12' and carries friction members 13' on its surfaces, to be gripped between the brake disk 11' and inner surface of the disk 14'.

This disk 14' in this form of the invention, is bolted to the rear axle housing 15', as shown by Figure 6.

The operating yoke is indicated by the reference character 16' and connects with the bolts 17' that pass through openings formed in the disk 14', where they have their inner ends secured to the sleeve 18' which is of a construction to engage the disk 11' to move the disk 11' therewith.

The operation of the brake as shown by Figure 6 of the drawings is identical with the operation of the brake as shown by Figure 1, and further detailed disclosure as to the operation, is believed unnecessary.

Having thus described the invention what is claimed is:

1. In a brake, a supporting axle, a wheel mounted on the axle, a brake housing secured to the wheel, a sleeve mounted for sliding movement on the axle and having an annular flange at one end thereof, a brake disc rotatable with the housing and loosely mounted on the sleeve, anti-friction members between the flange and disc, a brake disc mounted on the axle, a floating ring between the brake discs, means for operating the sleeve whereby the first mentioned brake disc is moved into clamping relation with the floating friction ring and second mentioned brake disc, and means for normally returning the first mentioned brake disc to its inactive position.

2. In a brake of the class described, the combination of a fixed brake disc, an axially movable sleeve, an annular flange extending from one end of the sleeve, an axially movable brake disc having an opening through which the sleeve extends, roller bearings between the flange and disc whereby the brake disc is permitted to rotate with respect to the sleeve and flange, a floating brake ring between the fixed brake disc and the axially movable brake disc, and means for moving the sleeve and axially movable brake disc into clamping relation with the floating brake ring, and fixed brake disc.

FRED H. SHARAR.